United States Patent
Miyamoto et al.

(10) Patent No.: US 7,071,832 B2
(45) Date of Patent: Jul. 4, 2006

(54) ELECTRONIC DIGITAL PRESSURE SWITCH

(75) Inventors: Yoshio Miyamoto, Ota (JP); Tsutomu Yamaguchi, Ota (JP)

(73) Assignee: Sanyo Electric Co., Ltd., Osaka (JP)

( * ) Notice: Subject to any disclaimer, the term of this patent is extended or adjusted under 35 U.S.C. 154(b) by 79 days.

(21) Appl. No.: 10/756,827

(22) Filed: Jan. 14, 2004

(65) Prior Publication Data

US 2004/0187585 A1    Sep. 30, 2004

(30) Foreign Application Priority Data

| Feb. 18, 2003 | (JP) | ............................. 2003-040197 |
| Feb. 18, 2003 | (JP) | ............................. 2003-040199 |
| Mar. 4, 2003  | (JP) | ............................. 2003-057385 |

(51) Int. Cl.
*G08B 17/10* (2006.01)

(52) U.S. Cl. .................... 340/632; 340/634; 340/626

(58) Field of Classification Search ................ 340/605, 340/606, 611, 614, 626, 632, 634; 372/57, 372/59; 128/200.14, 22.23; 137/240, 597, 137/624.15
See application file for complete search history.

(56) References Cited

U.S. PATENT DOCUMENTS

| 4,352,376 | A | * | 10/1982 | Norwood ................ 137/624.15 |
| 5,640,149 | A | * | 6/1997  | Campbell ................... 340/626 |
| 5,676,129 | A | * | 10/1997 | Rocci et al. ........... 128/200.23 |
| 5,748,656 | A | * | 5/1998  | Watson et al. ................ 372/35 |
| 6,021,150 | A | * | 2/2000  | Partio et al. .................. 372/57 |
| 6,314,986 | B1 | * | 11/2001 | Zheng et al. ................ 137/240 |

FOREIGN PATENT DOCUMENTS

JP          2000-75810        3/2000

* cited by examiner

*Primary Examiner*—Van T. Trieu
(74) *Attorney, Agent, or Firm*—Westerman, Hattori, Daniels & Adrian, LLP.

(57) ABSTRACT

An electronic digital pressure switch for detecting gas pressures features improved safety. The digital pressure switch that detects gas pressures and generates outputs has a housing provided with pinholes that allow a gas to pass therethrough. With this arrangement, even if a gas should leak into the housing, the leakage gas is let out through the pinholes. Thus, when the pressure of a flammable gas is detected, it is possible to eliminate the danger of an explosion caused by the flammable gas accumulating in the housing.

10 Claims, 9 Drawing Sheets

1. SETTING 2
2. DELAY
3. FORCED ACTUATION 2
4. OPERATION
5. SETTING 1
6. DELAY
7. PRESSURE CORRECTION
8. FORCED ACTUATION 1

1. SETTING 2
2. DELAY
3. FORCED ACTUATION 2
4. OPERATION
5. SETTING 1
6. DELAY
7. PRESSURE CORRECTION
8. FORCED ACTUATION 1

(12) United States Patent

ELECTRONIC DIGITAL PRESSURE SWITCH

BACKGROUND OF THE INVENTION

The present invention relates to an electronic digital pressure switch that detects a fluid pressure in a system for supplying or circulating a fluid, such as a gas or a liquid, and generates an output.

Hitherto, a refrigerator that forcibly circulates a refrigerant gas in a refrigerant circuit or a system, such as a gas forced-feed system for forcibly feeding a gas or the like uses a compressor for compressing and discharging a gas and also uses a digital pressure switch to control low/high pressures in the system (refer to, for example, Japanese Unexamined Patent Application Publication No. 2000-75810).

This type of a conventional digital pressure switch has a device for detecting the pressure of a gas in the system, a display unit for displaying the pressure detected by the detecting device, and a contact output that turns on/off according to the detected pressure. The contact output is used to, for example, stop a compressor if a refrigerant gas pressure on a low pressure side in a refrigerant circuit of a refrigerator comes down to a predetermined value.

Since the digital pressure switch is used for detecting gas pressures, as described above, a gas is drawn into the digital pressure switch itself. Hence, if the gas is flammable, there has been a danger in that leakage of the gas into the housing of the digital pressure switch causes the gas to accumulate therein and eventually explode.

A conventional digital pressure switch has been exclusively used for displaying pressure levels and controlling pressures in a system. If the digital pressure switch can be further used to carry out operation control of a unit in the system, such as the abovementioned compressor, and also to handle abnormal pressures, then the construction of the controller of the system can be simplified.

SUMMARY OF THE INVENTION

Accordingly, the present invention has been made to overcome the aforementioned technological limitations of the prior art and it is an object of the present invention to improve the safety of an electronic digital pressure switch for detecting gas pressures.

It is another object of the present invention to restrain an increase of the size of an electronic digital pressure switch while enhancing the features and convenience of the electronic digital pressure switch.

To these ends, according to one aspect of the present invention, there is provided an electronic digital pressure switch for detecting gas pressures and generating outputs, the electronic digital pressure switch being provided with a housing that has a ventilating portion allowing gases to pass therethrough. With this arrangement, even if a gas should leak out into the housing, the leakage gas goes outside through the ventilating portion.

Hence, when detecting the pressure of a flammable gas, it is possible to eliminate the danger of an accident of the flammable gas accumulating in the housing and causing an explosion. This permits improved safety to be achieved.

According to the present invention, in addition to the above feature, the ventilating portion is provided at an upper position of the housing when detecting the pressure of a gas that is lighter than air, while the ventilating portion is provided at a lower position of the housing when detecting the pressure of a gas that is heavier than air. This makes it possible to quickly discharge a gas from the housing according to the specific gravity of the gas.

Moreover, according to the present invention, in addition to the above aspect of the invention, the ventilating portions are provided at both upper and lower positions of the housing so as to be capable of handling both gases that are lighter than air and gases that are heavier than air.

According to yet another aspect of the present invention, there is provided an electronic digital pressure switch for detecting pressures and generating outputs, the electronic digital pressure switch having a contact output that turns ON/OFF according to detected pressures and that allows ON and OFF values to be set, a display unit that digitally displays detected pressures and also digitally displays ON/OFF values of the contact output by switching an operation mode, and an analog output that changes its output values according to detected pressures. With this arrangement, equipment can be controlled using the analog output while taking necessary corrective action at the same time for abnormal pressures or the like by the contact output, as in the past, thus permitting a simplified construction of a controller to be achieved.

Moreover, according to the present invention, a plurality of contact outputs is provided so as to permit detailed settings to successfully cope with abnormal pressures or the like by the plurality of contact outputs. Furthermore, delays can be set for the contact outputs, so that malfunctions attributable to, for example, temporary fluctuations, can be restrained.

According to a further aspect of the present invention, there is provided an electronic digital pressure switch for detecting pressures and generating outputs, the electronic digital pressure switch having a contact output that turns ON/OFF according to detected pressures and that allows ON and OFF values to be set, a display unit that digitally displays detected pressures and also digitally displays ON/OFF values of the contact output by switching an operation mode, a terminal board for connecting an external wire to the contact output, and an analog output that changes its output values according to detected pressures. This arrangement makes it possible to control equipment by the analog output while taking necessary corrective action for abnormal pressures or the like at the same time by the contact output, as in the past, thus permitting a simplified construction of a controller to be achieved.

The analog output, in particular, is directly drawn out from a substrate, obviating the need for adding another pole to the terminal board to accommodate the analog output. With this arrangement, it is possible to prevent the size of the terminal board from increasing in a case where the terminal board has already the poles for a plurality of contact outputs and a power source. This in turn makes it possible to prevent the size of the entire electronic digital pressure switch from being inconveniently increased.

DETAILED DESCRIPTION OF THE PREFERRED EMBODIMENT

An embodiment of the present invention will be discussed in detail with reference to the attached drawings.

Figure 8:
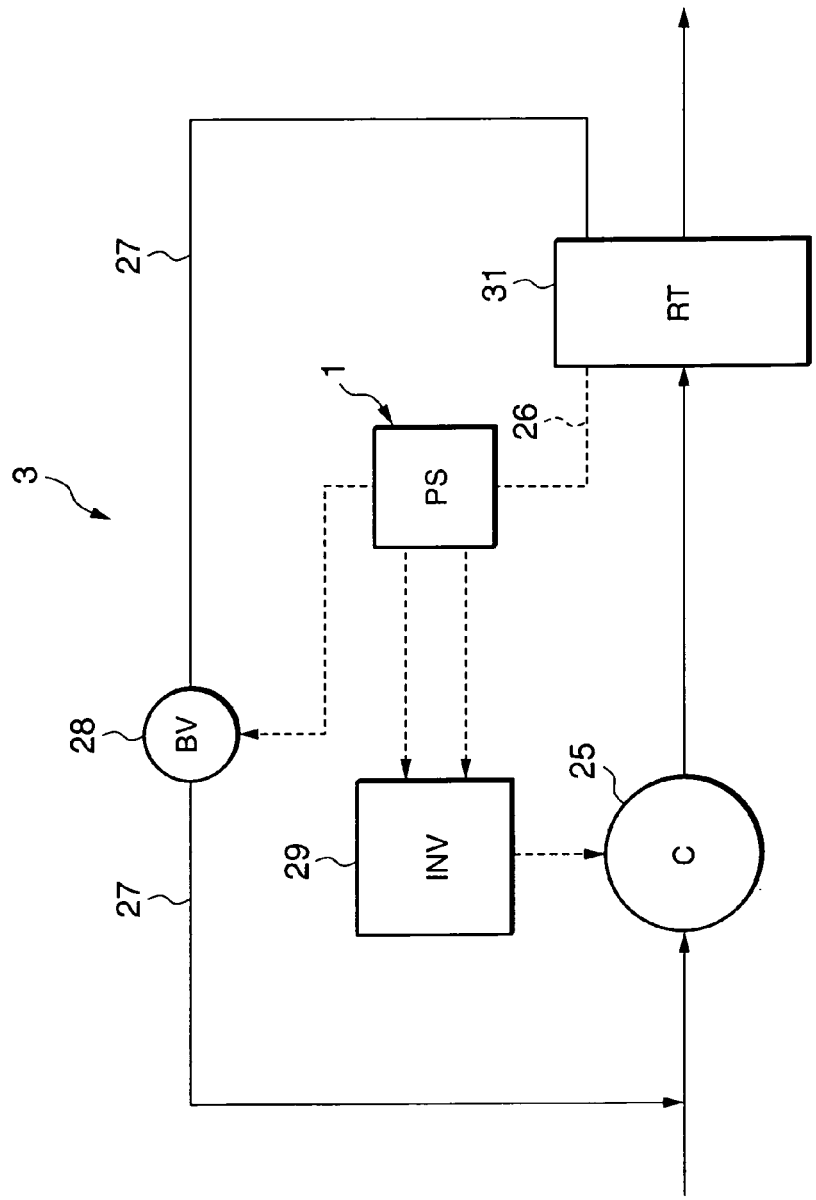
FIG. 8 is a circuit diagram of a gas forced-feed system.

A digital pressure switch 1 according to the embodiment is used to detect pressures on a high-pressure end of a gas forced-feed system 3 and generate control outputs, as illustrated in FIG. 8. A pressure detection pipe joint 6 is installed to the bottom surface of a housing 4 shown in FIGS. 1 through 6. An analog output line 7 is drawn out from the bottom surface, as will be discussed hereinafter. A cover 8 is installed at a bottom corner portion on the back of the housing 4 by screws such that the cover 8 is detachably installed. Under the cover 8, a terminal board 10 is provided for connecting external wires to a contact output 9 (OUTPUT 1), a contact output 11 (OUTPUT 2), and the like.

Figure 1:
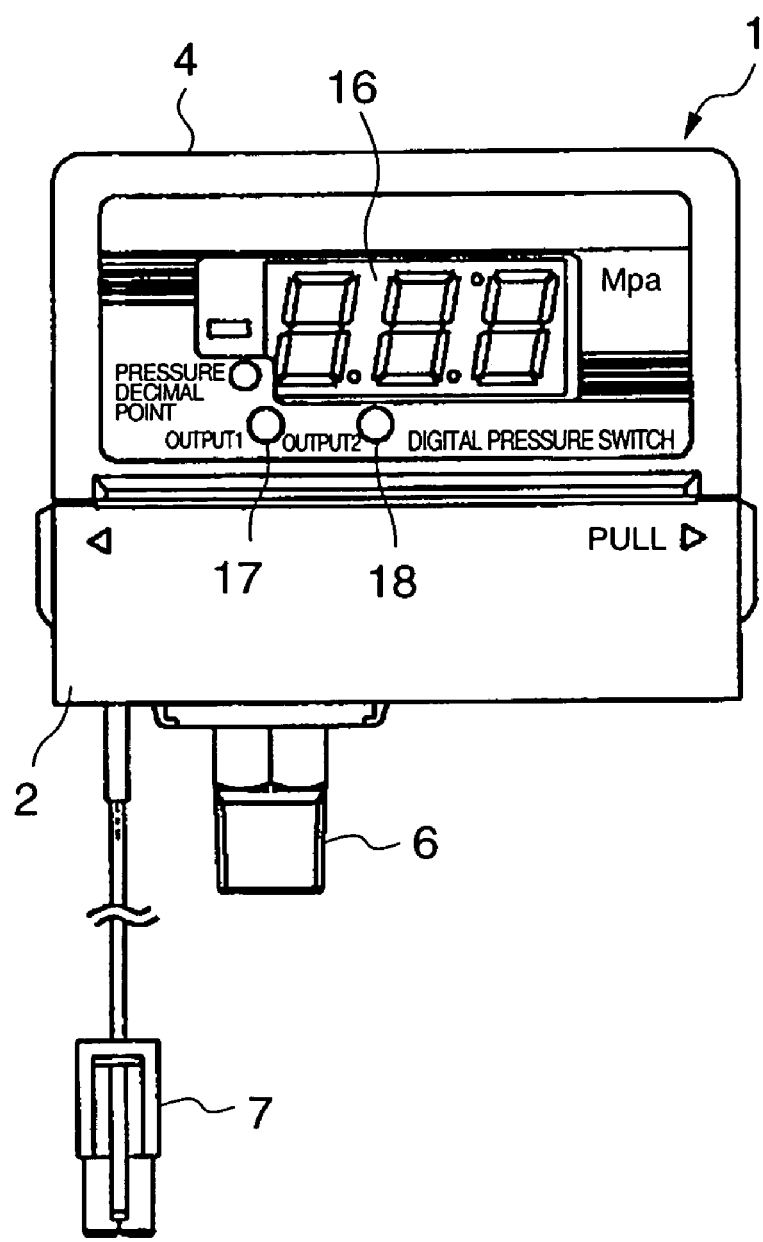
FIG. 1 is a front view of a digital pressure switch to which the present invention has been applied.
Figure 2:
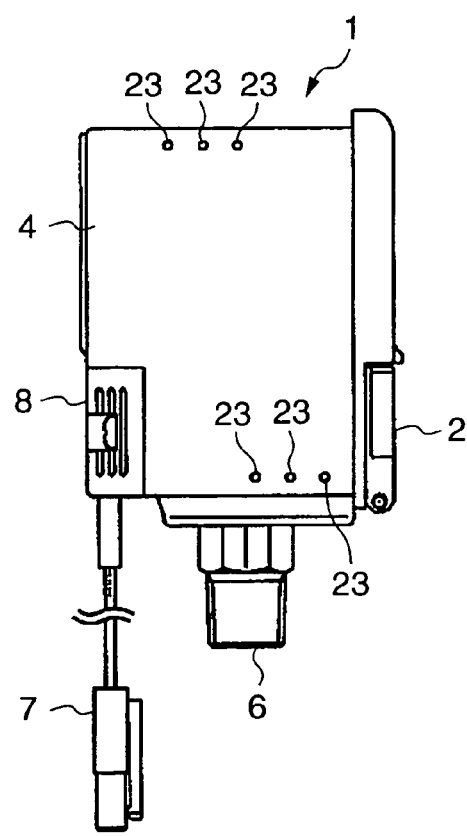
FIG. 2 is a right side view of the digital pressure switch shown in FIG. 1.
Figure 3:
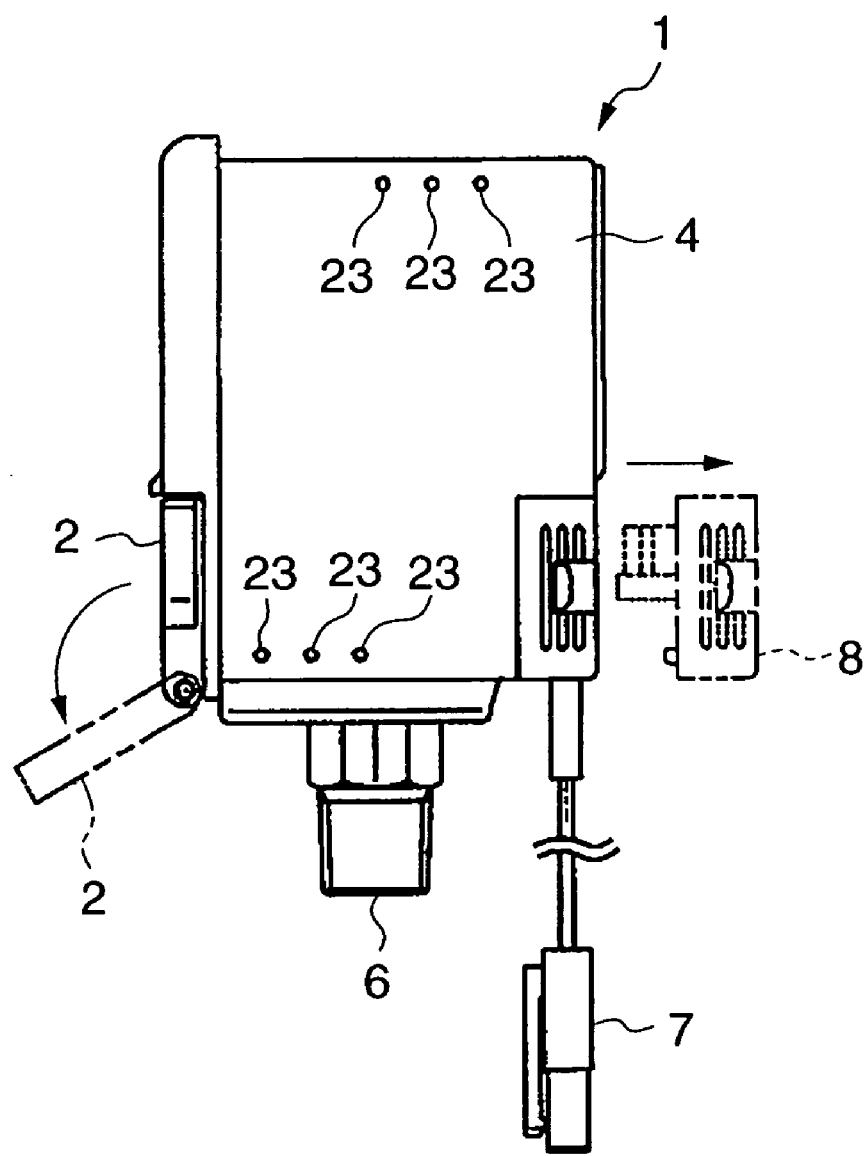
FIG. 3 is a left side view of the digital pressure switch shown in FIG. 1.
Figure 4:
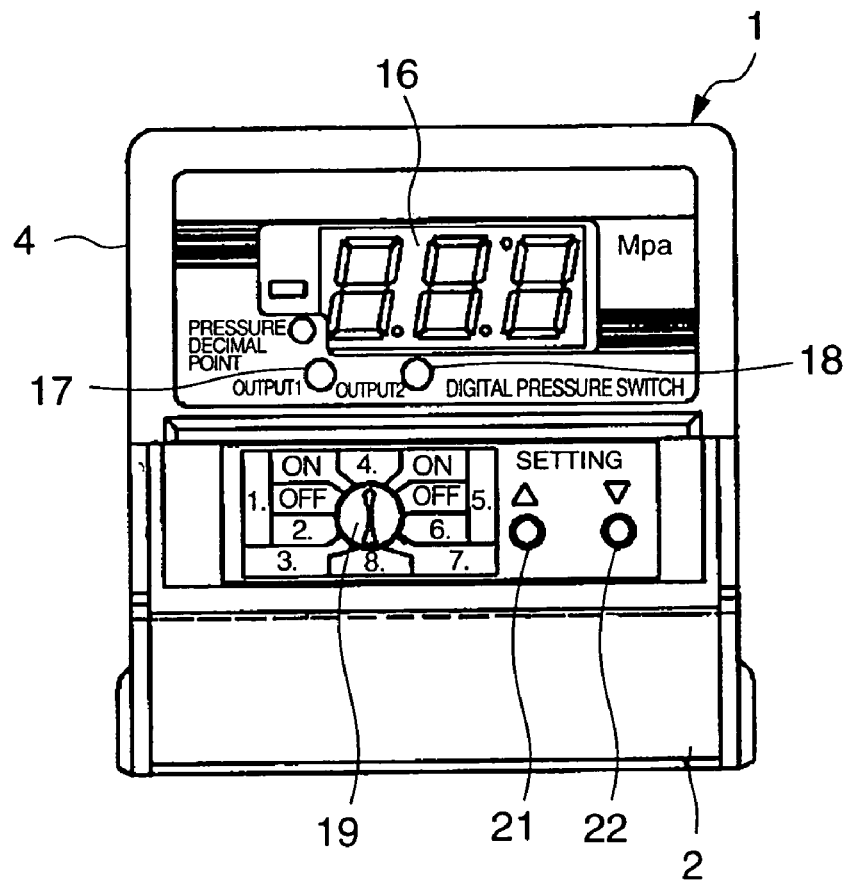
FIG. 4 is a front view of the digital pressure switch shown in FIG. 1, a panel thereof being open.
Figure 5:
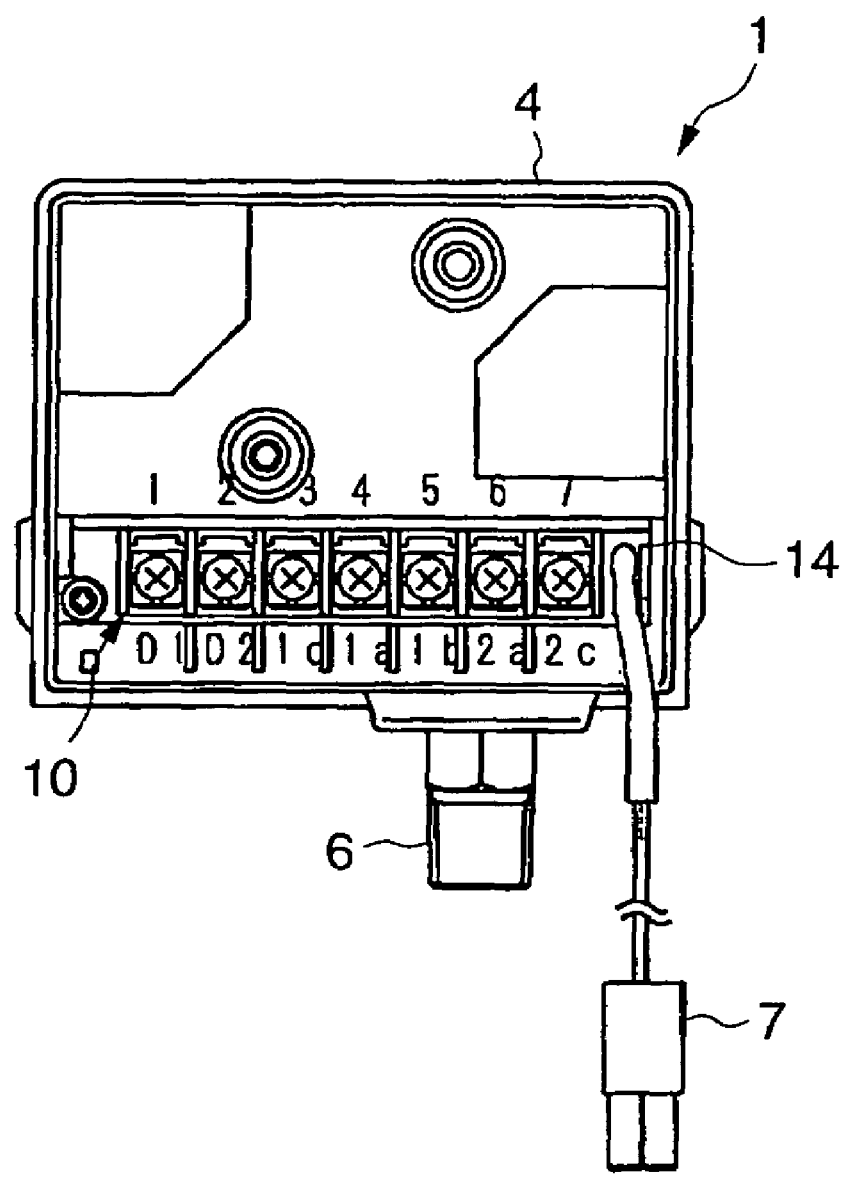
FIG. 5 is a rear view of the digital pressure switch shown in FIG. 1, a cover thereof having been removed.
Figure 6:
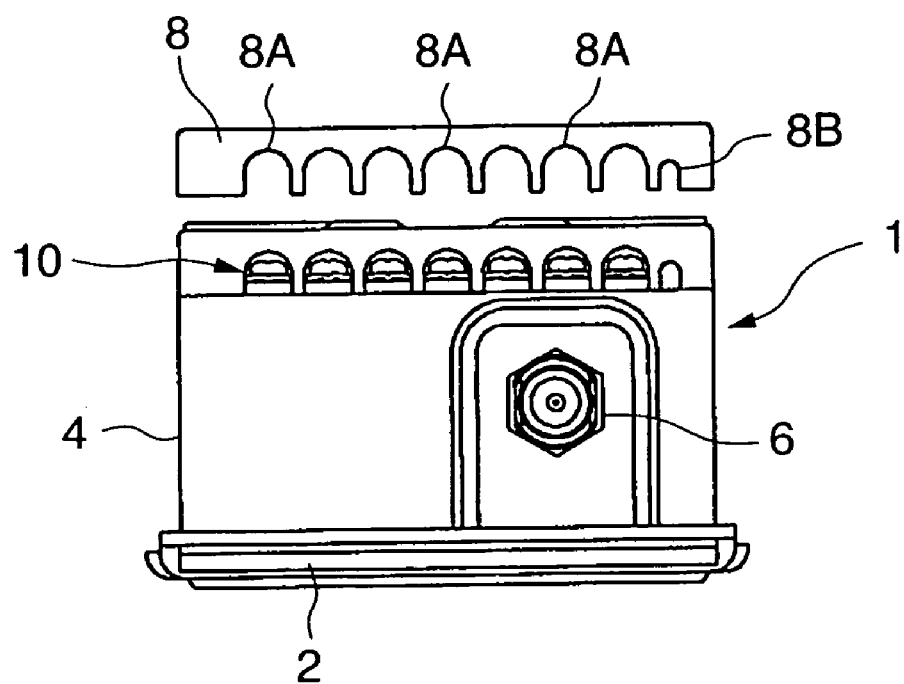
FIG. 6 is a bottom view of the digital pressure switch shown in FIG. 1, the cover thereof having been removed.

The terminal board 10 has a total of seven poles, namely, a power source D1, a power source D2, 1c, 1a and 1b of the contact output 9, and 2a and 2c of the contact output 11 from the left in FIG. 5, as observed facing against the figure. A substrate 14, which will be discussed later, is provided in the housing 4, the terminal board 10 and electronic components to be discussed later being provided thereon. The analog output line 7 is directly drawn out downwards from the substrate 14, passing the right side of the terminal board 10 (the right side in FIG. 5).

The cover 8 has a total of seven notches 8A for leading out external wires that correspond to the poles of the terminal board 10. The cover 8 also has a notch 8B for leading out the analog output line 7 (not shown in FIG. 6) at the rightmost end (right end in FIG. 6). The analog output line 7 is pulled out downwards from the housing 4 through the notch 8B of the cover 8.

Figure 7:
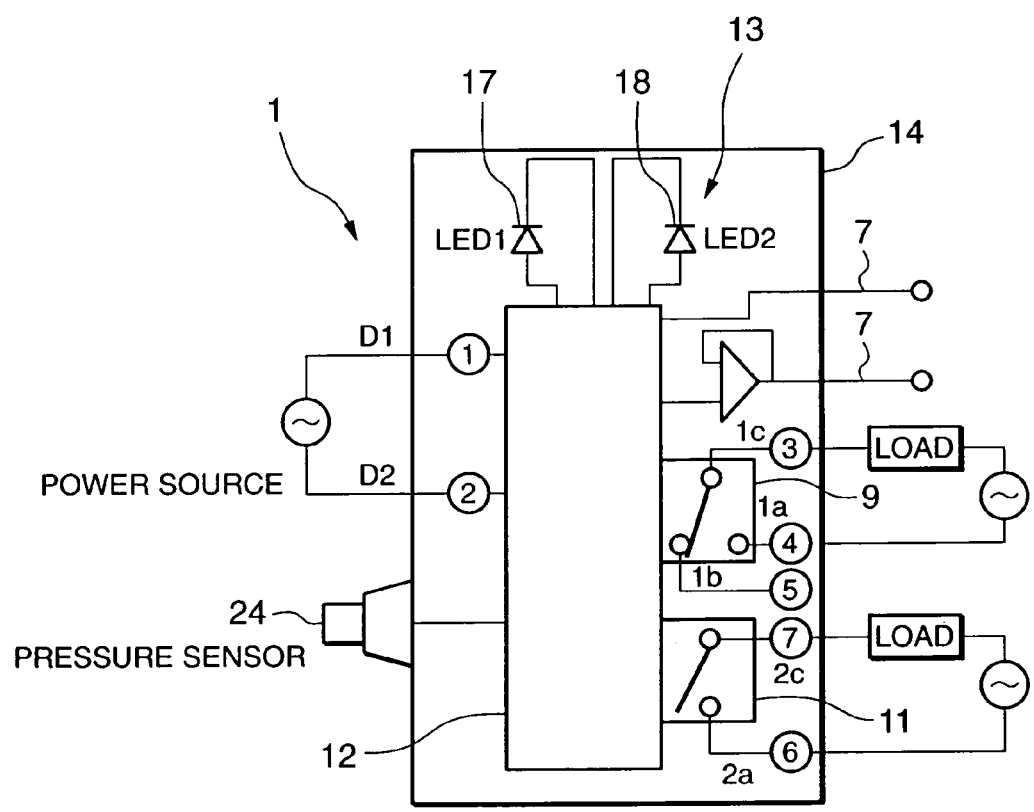
FIG. 7 is a block diagram of an electric circuit of the digital pressure switch shown in FIG. 1.

Inside the housing 4, a controller 13 formed of an electronic circuit 12 having a microcomputer shown in FIG. 7 is mounted on the substrate 14. A digital display unit 16 serving as a displaying unit is disposed on a front upper portion of the housing 4. The digital display unit 16 is formed of a three-digit, seven-segment LED. Furthermore, LEDs 17 and 18 for displaying operations of the contact output 9 (OUTPUT 1) and the contact output 11 (OUTPUT 2) are disposed below the digital display unit 16. When the contact output 9 turned on, the LED 17 comes on. When the contact output 11 turns on, the LED 18 comes on.

A front lower portion of the housing 4 is recessed, and has a rotary switch 19, an up-setting switch 21, and a down-setting switch 22 provided thereon. These components are covered by a panel 2, which is detachably installed.

A plurality of pinholes 23 (three holes in the embodiment) is drilled at the top and bottom of each of the right and left side surfaces of the housing 4. These pinholes 23 constitute the ventilating portions that allow a gas to circulate into and out of the housing 4. The sizes of the pinholes 23 should be such that they allow a gas to pass therethrough, but do not allow liquids, such as rainwater, to pass therethrough. Forming the pinholes 23 in a plurality of places at the tops and bottoms of the right and left side surfaces of the housing 4 creates a ventilating function that is effective, regardless of the properties of a gas or fluid to be used, that is, regardless of whether they are lighter or heavier than air.

Referring now to FIG. 7, a pressure sensor 24 has its output connected to the electronic circuit 12. The pressure sensor 24 outputs a pressure detected through a pressure detection pipe 26, which will be described later and which is connected to the pressure detection pipe joint 6, and outputs the detected pressure in the form of a voltage. The electronic circuit 12 is provided with the aforementioned contact outputs 9 and 11, loads to be discussed hereinafter being connected to power sources through the contact outputs 9 and 11, respectively. The electronic circuit 12 outputs voltage values, which vary in proportion to pressures detected by the pressure sensor 24, to the analog output line 7.

Referring now to FIG. 8, the gas forced-feed system 3 is constructed primarily of a nonlubricated reciprocating compressor 25 that draws in and compresses a gas (e.g., a refrigerant gas, a sulfur hexafluoride gas, or a flammable gas), a reservoir tank 31 that is connected to the discharging end of the compressor 25 and temporarily stores a gas that has been compressed by and discharged from the compressor 25, a bypass pipe 27 connecting the reservoir tank 31 to the inlet end of the compressor 25, a bypass valve (solenoid valve) 28 provided in the bypass pipe 27, and an inverter circuit 29 for PID-controlling the turning ON/OFF of the compressor 25 and its rotational speed (Hz).

A gas drawn in from a gas source is compressed by the compressor 25 and discharged, and then temporarily stored in the reservoir tank 31 before it is forcibly fed to a gas consuming machine. The pressure detection pipe 26 connected in communication in the reservoir tank 31 of the gas forced-feed system 3 is linked to the pressure detection pipe joint 6 of the digital pressure switch 1 according to the present invention. The inverter circuit 29 is connected as a load to the contact output 9 (OUTPUT 1), while the bypass valve 28 is connected as a load to the contact output 11 (OUTPUT 2). The analog output line 7 is connected to the inverter circuit 29.

Figure 9:
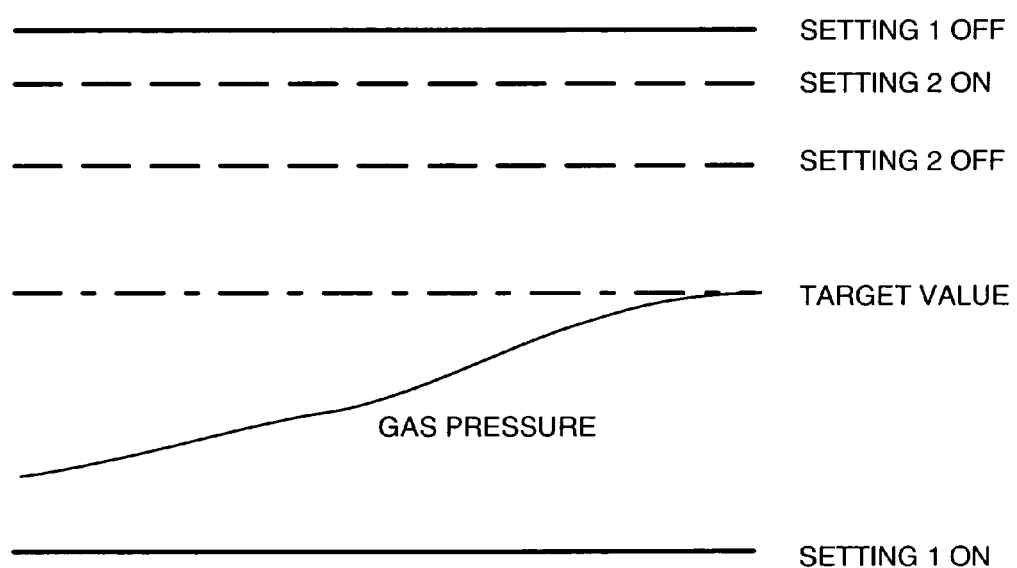
FIG. 9 is a diagram for explaining operations of the digital pressure switch shown in FIG. 1 and the gas forced-feed system shown in FIG. 6.

Referring to FIG. 9, the behaviors and operations of the digital pressure switch 1 and the gas forced-feed system 3 having the aforementioned constructions will now be explained. First, the pressure detection pipe 26 is connected to the pressure detection pipe joint 6, and then the cover 8 is opened to connect external wires to the poles of the terminal board 10. Then, the cover 8 is fixed with screws to cover the terminal board 10 and the drawn-out portion of the analog output line 7.

A description will now be given of a setting procedure of the contact outputs 9 (OUTPUT 1) and 11 (OUTPUT 2) of the digital pressure switch 1. First, the panel 2 is opened (FIG. 4), and the rotary switch 19 is set to ON of SETTING 1. In this state, the up-setting switch 21 and the down-setting switch 22 are depressed to set an ON value of the contact output 9 (OUTPUT 1). The set value is digitally displayed on the digital display unit 16. Then, the rotary switch 19 is set to OFF of SETTING 1, and the switches 21 and 22 are depressed in the same manner to set an OFF value of the contact output 9 (OUTPUT 1).

Next, the rotary switch 19 is set to ON of SETTING 2. In this state, the up-setting switch 21 and the down-setting switch 22 are depressed to set an ON value of the contact output 11 (OUTPUT 2). The set value is also digitally displayed on the digital display unit 16. Then, the rotary switch 19 is set to OFF of SETTING 2, and the switches 21 and 22 are depressed in the same manner to set an OFF value of the contact output 11 (OUTPUT 2). In this embodiment, the target value of a gas pressure is set to, for example, 6 MPa, the OFF value (SETTING 1 OFF) of the contact output 9 is set to, for example, 7 MPa, the ON value (SETTING 1 ON) of the contact output 9 is set to, for example, 5 MPa, the ON value (SETTING 2 ON) of the contact output 11 is set to, for example, 6.8 MPa, and the OFF value (SETTING 2 OFF) of the contact output 11 is set to, for example, 6.5 MPa. Thereafter, the rotary switch 19 is set to the position of OPERATION. Thus, these set values are stored in a memory in the electronic circuit 12.

If it is assumed that the gas pressure in the reservoir tank 31 is sufficiently low, then the contact output 9 (OUTPUT 1) of the digital pressure switch 1 is ON and the contact output 11 (OUTPUT 2) thereof is OFF. Hence, the bypass valve 28 is closed. This allows the inverter circuit 29 to be actuated, starting up the compressor 25. When the compressor 25 is started up, the gas compressed by the compressor 25 is discharged into the reservoir tank 31, and then forcibly fed to a gas consuming machine.

The pressure sensor 24 of the digital pressure switch 1 detects the pressure of the gas in the reservoir tank 31 that flows in through the pressure detection pipe 26, causing an output voltage to change. The electronic circuit 12 detects the current gas pressure in the reservoir tank 31 from a gas pressure (output voltage) detected by the pressure sensor 24, and causes the gas pressure to be digitally displayed on the digital display unit 16. The electronic circuit 12 also outputs a voltage value that is proportional to the gas pressure to the analog output line 7.

Based on the voltage value (gas pressure) input through the analog output line 7 of the digital pressure switch 1, the inverter circuit 29 carries out arithmetic operations of P (proportion), integration (I), and differentiation (D) on the basis of an error e from the target value 6 MPa so as to determine the rotational speed (Hz) of the compressor 25. Thus, the gas pressure in the reservoir tank 31 is accurately set closer to the target value.

If the gas pressure in the reservoir tank 31 suddenly rises due to a sudden reduction in gas consumption by the gas consuming machine, then the PID control by the inverter circuit 29 is no longer effective. If the increasing gas pressure detected by the digital pressure switch 1 exceeds 6.8 MPa (SETTING 2 ON), then the electronic circuit 12 turns the contact output 11 (OUTPUT 2) on, the LED 18 being turned ON, to open the bypass valve 28. This causes the gas in the reservoir tank 31 to move toward the inlet end of the compressor 25 through the bypass pipe 27, so that the rise in pressure is restrained, and the pressure usually switches to drop. When the pressure level comes down to 6.5 MPa (SETTING 2 OFF), the electronic circuit 12 turns the contact output 11 (OUTPUT 2) off, the LED 18 being turned off, to close the bypass valve 28.

Thus, relieving pressure through the bypass pipe 27 makes it possible to restrain the interruption of the compressor 25, which will be discussed later. This will prolong its service life or restrain the occurrence of failures or anomalies of gas consuming machines.

If the rise in pressure does not stop even after the bypass valve 28 is released and the gas pressure in the reservoir tank 31 reaches 7 MPa (SETTING 1 OFF), then the electronic circuit 12 turns the contact output 9 (OUTPUT 1) off, the LED 17 being turned off. The inverter circuit 29 stops the compressor 25 when the contact output 9 (OUTPUT 1) is turned off. Stopping the compressor 25 causes the gas pressure in the reservoir tank 31 to drop. When the gas pressure level comes down and reaches 5 MPa (SETTING 1 ON), the electronic circuit 12 turns the contact output 9 (OUTPUT 1) on, LED 17 being turned on. When the contact output 9 (OUTPUT 1) is turned on, the inverter circuit 29 restarts the compressor 25. Thus, an abnormal rise in the pressure in the reservoir tank 31 (the high pressure end of the compressor 25) can be prevented.

Since the gas in the reservoir tank 31 flows into the pressure detection pipe 26, there is a danger in that the gas leaks into the housing 4 of the digital pressure switch 1. Especially when the gas is a flammable gas, such as a city gas, propane gas, butane, or natural gas, there is a danger in that a gas built up in the housing 4 leads to an explosion. However, the plurality of pinholes 23 formed in the right and left side surfaces of the housing 4 lets a gas leaked into the housing 4 escape through the pinholes 23, as mentioned above. This makes it possible to avoid the danger of explosion. The pinholes 23 prevent rainwater from passing therethrough, thus protecting the housing 4 from water even when it is installed outdoors.

Since the pinholes 23 are formed in both upper and lower portions of the housing 4, a gas, such as a city gas, which is lighter than air, is quickly exhausted through the upper pinholes 23, while a gas, such as propane gas or butane, which is heavier than air, is also quickly exhausted through the lower pinholes 23.

In the present embodiment, the pinholes 23 are formed at the upper and lower portions of the housing 4. Alternatively, however, the pinholes 23 may be formed only in the upper portion if a gas that is lighter than air is used, or formed only in the lower portion if a gas that is heavier than air is used. A natural gas, however, may be heavier or lighter than air, depending on its components. In this case, therefore, the pinholes 23 may be formed in both upper and lower portions of the housing 4, as in the present embodiment, so as to handle both lighter-than-air gases and heavier-than-air gases.

Furthermore, delay time can be set for the ON values and the OFF values of the contact output 9 (OUTPUT 1) and the contact output 11 (OUTPUT 2) of the digital pressure switch 1 by operating the rotary switch 19 and the up-setting switch 21 and the down-setting switch 22. Setting the delay time allows the contact outputs to turn on or off with delays from the moment the gas pressure reaches the ON or OFF values. Accordingly, if the ON value (SETTING 1 ON) of the contact output 9 (OUTPUT 1) in the above embodiment is set to, for example, 5.5 MPa or the like and the delay time is set to, for example, 10 seconds (for which pressure level usually does not drop 0.5 MPa), then control can be conducted to turn the compressor 25 on before the pressure level comes down to 5 MPa.

Two contract outputs are provided in the aforementioned embodiment. Alternatively, however, only one contact output or three or more contact outputs may be provided. The ventilating portions in the embodiment are formed of pinholes; however, they may alternatively be formed of slits or notches. In the embodiment, the digital pressure switch 1 has been applied to the gas forced-feed system 3; however, the application thereof is not limited thereto. The digital pressure switch 1 is effectively applied also to a high-pressure end of a refrigerating machine that forcibly circulates a refrigerant gas in a refrigerant circuit or to equipment that forcibly feeds a liquid or fluid.

Thus, as explained in detail, according to the present invention, an electronic digital pressure switch for detecting gas pressures and generating outputs is provided with a housing that has a ventilating portion allowing gases to pass therethrough. With this arrangement, even if a gas should leak out into the housing, the leakage gas escapes outside through the ventilating portion.

Hence, even when detecting the pressure of a flammable gas, it is possible to eliminate the danger of an accident of the flammable gas accumulating in the housing and causing an explosion. This permits improved safety to be achieved.

According to the present invention, in addition to the above feature, the ventilating portion is provided at an upper position of the housing when detecting the pressure of a gas that is lighter than air, while the ventilating portion is provided at a lower position of the housing when detecting the pressure of a gas that is heavier than air. This makes it possible to quickly discharge a gas from the housing according to the specific gravity of the gas.

Moreover, according to the present invention, in addition to the above aspect of the invention, the ventilating portions are provided both at upper and lower positions of the housing so as to be capable of handling both gases that are lighter than air and gases that are heavier than air.

According to yet another aspect of the present invention, an electronic digital pressure switch for detecting pressures and generating outputs has a contact output that turns ON/OFF according to detected pressures and that allows ON and OFF values to be set, a display unit that digitally displays detected pressures and also digitally displays ON/OFF values of the contact output by switching an operation mode, and an analog output that changes its output values according to detected pressures. With this arrangement, equipment can be controlled using the analog output while taking necessary corrective action for abnormal pressures or the like by the contact output at the same time, as in the past, thus permitting a controller to have a simplified construction.

Moreover, according to the present invention, a plurality of contact outputs is provided so as to permit detailed settings to successfully cope with abnormal pressures or the like by the plurality of contact outputs. Furthermore, delay time can be set for the contact outputs, so that malfunctions attributable to, for example, temporary fluctuations, can be restrained.

According to a further aspect of the present invention, an electronic digital pressure switch for detecting pressures and generating outputs has a contact output that turns ON/OFF according to detected pressures and that allows ON and OFF values to be set, a display unit that digitally displays detected pressures and also digitally displays ON/OFF values of the contact output by switching, a terminal board for connecting an external wire to the contact output, and an analog output that changes its output values according to detected pressures. This arrangement makes it possible to control equipment by the analog output while taking necessary corrective action for abnormal pressures or the like by the contact output at the same time, as in the past, thus permitting a controller to have a simplified construction.

The analog output in particular is directly drawn out from a substrate, obviating the need for adding another pole to the terminal board to accommodate the analog output. With this arrangement, it is possible to prevent the size of the terminal board from increasing in a case where the terminal board has already the poles for a plurality of contact outputs and a power source. This in turn makes it possible to prevent the size of the entire electronic digital pressure switch from being inconveniently increased.

What is claimed is:

1. An electronic digital pressure switch for detecting a gas pressure comprising:
    a housing having a ventilating portion allowing a gas to pass therethrough; and
    a pressure sensor inside the housing to detect pressure of a gas supplied to the housing and to generate an output representing the detected pressure,
    wherein the output generated by the pressure sensor is used to control the pressure of the gas supplied to the housing.

2. The electronic digital pressure switch according to claim 1, wherein the ventilating portion is provided at an upper position of the housing when detecting the pressure of a gas that is lighter than air, while the ventilating portion is provided at a lower position of the housing when detecting the pressure of a gas that is heavier than air.

3. The electronic digital pressure switch according to claim 1, wherein the ventilating portions are provided at both upper and lower positions of the housing.

4. An electronic digital pressure switch for detecting pressures and generating outputs, comprising:
    a contact output that turns ON/OFF according to detected pressures and that allows ON and OFF values to be set;
    a display means that digitally displays detected pressures and also digitally displays ON/OFF values of the contact output by switching an operation mode; and
    an analog output that changes its output values according to detected pressures.

5. The electronic digital pressure switch according to claim 4, comprising a plurality of the contact outputs.

6. The electronic digital pressure switch according to claim 4 or claim 5, wherein delay time can be set for the contact output or the contact outputs.

7. An electronic digital pressure switch for detecting pressures and generating outputs, comprising:
    a contact output that turns ON/OFF according to detected pressures and that allows ON and OFF values to be set;
    a display means that digitally displays detected pressures and also digitally displays ON/OFF values of the contact output by switching an operation mode;
    a terminal board for connecting an external wire to the contact output; and
    an analog output that changes its output values according to detected pressures,
    wherein the analog output is directly drawn out from a substrate.

8. The electronic digital pressure switch according to claim 7, further comprising:
    a plurality of the contact outputs,
    wherein the terminal board has as many poles as the number of the contact outputs and power sources.

9. An electronic digital pressure switch for detecting a gas pressure and generating an output, comprising:
    a housing that has a ventilating portion allowing a gas to pass therethrough,
    wherein the ventilating portion is provided at an upper position of the housing when detecting the pressure of a gas that is lighter than air, while the ventilating portion is provided at a lower position of the housing when detecting the pressure of a gas that is heavier than air.

10. The electronic digital pressure switch according to claim 9,
    wherein the output generated by the digital pressure switch is used to control the gas pressure detected by the digital pressure switch.

* * * * *